(12) United States Patent
Bortoli et al.

(10) Patent No.: US 8,137,120 B2
(45) Date of Patent: Mar. 20, 2012

(54) ADAPTER DEVICE FOR HOUSING A MULTI-PHASE LOW VOLTAGE SWITCH INSIDE A SWITCHBOARD AND RELATIVE ADAPTER-SWITCH AND SWITCHBOARD ASSEMBLY

(75) Inventors: Mario Bortoli, Cervignano d' Adda (IT); Stefano Besana, Terno d'Isola (IT)

(73) Assignee: ABB S.p.A., Milan (IT)

( * ) Notice: Subject to any disclaimer, the term of this patent is extended or adjusted under 35 U.S.C. 154(b) by 0 days.

(21) Appl. No.: 12/788,524

(22) Filed: May 27, 2010

(65) Prior Publication Data

US 2010/0304585 A1 Dec. 2, 2010

(30) Foreign Application Priority Data

May 28, 2009 (IT) .............................. BG2009A0029

(51) Int. Cl.
*H01R 25/00* (2006.01)
(52) U.S. Cl. ...................................................... 439/115
(58) Field of Classification Search .................. 439/115; 361/677, 673, 637, 609; 200/289; 336/5
See application file for complete search history.

(56) References Cited

U.S. PATENT DOCUMENTS

| 1,955,287 | A | * | 4/1934 | Graves, Jr. et al. ........... 361/609 |
| 3,728,585 | A | | 4/1973 | Olashaw |
| 3,764,765 | A | | 10/1973 | Olashaw |
| 2007/0115630 | A1 | * | 5/2007 | Midgley ........................ 361/690 |

FOREIGN PATENT DOCUMENTS

| DE | 10 2007 023980 B3 | 9/2008 |
| EP | 1995840 A1 | 11/2008 |
| GB | 453298 A | 9/1936 |

* cited by examiner

*Primary Examiner* — Alexander Filman
(74) *Attorney, Agent, or Firm* — Connolly Bove Lodge & Hutz LLP (57) ABSTRACT

An adapter device (1; 201; 401; 501) for housing a multi-phase low voltage type switch (2) inside a switchboard (100), comprising, for each phase:
first and second electric connection means (31, 32) with the switch (2);
third and fourth electric connection means (33, 34) with an electric distribution network (4);
the adapter device (1; 201; 401; 501) is structured so as to define a connection area (10) housing the first and second electric connection means (31, 32), and
also comprising heat removal means (5; 205; 405; 505) which remove heat from the connection area (10).

15 Claims, 10 Drawing Sheets

ADAPTER DEVICE FOR HOUSING A MULTI-PHASE LOW VOLTAGE SWITCH INSIDE A SWITCHBOARD AND RELATIVE ADAPTER-SWITCH AND SWITCHBOARD ASSEMBLY

CROSS-REFERENCE TO RELATED APPLICATION

This application claims priority under 35 U.S.C. §119(a) on Patent Application No(s). BG2009A000029 filed in Italy on May 28, 2009, the entire contents of which are hereby incorporated by reference.

The present invention relates to an adapter device for housing a multi-phase low voltage type switch inside a switchboard. Moreover, the present invention relates to an adapter-switch assembly and a switchboard comprising said adapter device.

It is known that low voltage switching devices (i.e. for applications with operating voltages up to 1000V AC/1500V DC), such as automatic circuit breakers, disconnectors and contactors, universally called switching devices and subsequently called switches for the sake of brevity, are devices able to open or maintain open electric circuits. For example, automatic circuit breakers ensure that the rated current required can flow toward the various utilities, allowing correct connection and disconnection of the loads from the circuit and automatic sectioning of the circuit protected with respect to the electrical power source. Devices that allow abnormal operating conditions of a specific branch of a system to be recognized and consequent action to be taken with the opening of at least one of the switches present in the circuit are normally known as protective devices. The most widely used protective devices are of the thermal, magnetic, thermal magnetic or electronic type, also in combination with one another.

It is known that switches comprise a case, one or more electric poles, associated with each of which is at least one pair of contacts which can be mutually coupled and decoupled. Prior art switches also comprise an actuating mechanism which causes the relative movement of the pairs of contacts so that they can assume at least a coupling position (switch closed) and at least a separated position (switch open).

In common use, electrical equipment, and in particular switches, are installed inside distribution boards or switchboards present in electrical installations. Distribution boards normally comprise specific cells or cubicles provided for connection of equipment to the electricity distribution lines. Distribution lines are composed of conductor systems such as bars and cables. The use of appropriate distribution boards, besides improving the practicality and ergonomics of use of electrical installations, contribute toward maintaining over time adequate conditions of safety and correct operation of all the parts installed.

The choice of equipment to use and of the relative installation methods must be compatible with the technical specifications of the distribution board. This compatibility relates to electrical, dimensional, mechanical and thermal aspects. There are three main methods for installing switches in boards.

In particular, a first installation method for switches is known as "fixed" in which the electrical terminals of the switch are connected directly and permanently to the conductors of the distribution lines. This connection normally takes place by means of terminals or screws. A second installation method for switches is known as "removable" in which special adapter devices are used, mechanically constrained to the board, and connected permanently to the conductors of the distribution lines through their own electrical terminals; each switch is coupled mechanically to a corresponding adapter device and, through appropriate plug-in type electrical terminals, produces the electrical connection with the distribution line; plug-in type coupling normally comprises socket (or clamp) type elements and corresponding pin type elements provided on the switch and on the adapter.

A third installation method for switches is known as "withdrawable"; in substance this is a variant of the preceding removable method provided with additional elements, such as guide and/or support and/or handling means to facilitate operations to plug in and remove the switch.

In practice, the second and the third installation method are such as to produce an adapter-switch assembly that is extremely quick to install.

Of these three installation methods, the first is the most simple and least expensive, but is only suitable for final and rigid solutions.

The removable and withdrawable installation methods instead offer greater flexibility. In fact, once the adapter has been fixed in the board, they allow the switch to be installed or removed much more quickly and in total safety, and above all without having to act directly on the distribution lines.

Installation solutions of removable and withdrawable type are therefore characterized by the presence of adapter devices. Adapter devices or adapters are often also indicated as fixed parts or cradles.

However, the installation of removable and withdrawable type switches also has some drawbacks with respect to fixed installations. In fact, to produce a socket/pin type connection, it is necessary to use an additional electric connector element. Considering the assembly composed of the switch and of the relative adapter, it is in fact possible to schematize each pole or branch thereof as an electric chain composed of elements arranged in series. In this electric chain, each element contributes toward increasing the electrical resistance (or decreasing the total conductivity). The presence of these resistive elements, in this short length of electric chain, is naturally responsible for producing heat by the Joule effect.

The undesirable heat is generated both in the various copper conductive lengths and, above all, in each of the electrical connections present. In fact, the various connections present (and in particular, the socket/pin coupling and the main contacts of the switch, which by nature cannot be welded) introduce as many discontinuities, where considerable localized increases in electrical resistance can be located. The most critical peaks of energy leakage by the Joule effect tend to be concentrated in these areas (socket/pin coupling and main contacts of the switch), consequently producing undesirable heat. In particular, the heat producing effect increases in proportion to the square of the electric currents passing through the switch. As is evident, the heat generated due to these leakages contributes toward increasing the temperature of the adapter-switch assembly. However, as the temperature of the switch must be maintained within predetermined operating limits, each undesirable increase of the electrical resistance in the conductive branches in the system formed by the switch and by the relative adapter makes it necessary to limit the power that can be drawn by an appliance.

Moreover, an adapter device is known comprising a surface intended to couple with a corresponding surface of a switch. The adapter therefore comprises at least one coupling surface. Further, the body of the adapter often also comprises four lateral walls able to enclose the switch. These further walls are normally used to perform ancillary functions, for example housing sliding guides of the switch, interlock systems, withdrawal members, etc. However, the presence of further walls present around the switch forms a second enclosure undesirable from a thermal point of view, which tends to promote stagnation of heat and increase in temperature. Although it would undoubtedly be simpler to overcome this drawback by producing an adapter device without these lateral walls, said ancillary functions would not be achieved.

As it is known, the increase in temperature has a negative influence on the operation of switches. It is also known that the temperature of a switch tends to increase more rapidly if the characteristics of the adapter promote accumulation of heat. In practice, by means of the use of appropriate calculations that are generally implemented in calculation software that is costly and onerous in terms of hardware resources and time, it is possible to establish the maximum fraction of the theoretical full load at which a switch can operate in conditions of safety when it is installed in a given board. The fraction of the full load effectively usable (with respect to the theoretical rated capacity) is generally expressed in the form of derating coefficients which are based on the effective total installation conditions. These installation conditions take account of the combination between characteristics of the switch, of the adapter, of the cubicle, of the board, of the external environment, etc.

Many solutions have been introduced by the various manufacturers to decrease the contact resistance and make electrical coupling between switch and adapter increasingly more efficient or also to optimize the structure of the walls forming the adapter (reducing extension of the walls to strict technical necessities, producing openings for air circulation) so as to limit undesirable phenomena of heat build-up.

Yet other solutions have been adopted to improve the total thermal efficiency of the board. These last solutions undoubtedly offer some technical advantages but are generally somewhat ineffective, as they tend to withdraw heat above all from areas that are already relatively cool (such as the electric network and in particular the bus bars), rather than from the more critical areas from a thermal viewpoint (such as the inside of the switch or the socket/pin connections between switch and relative adapter).

The aim of the present invention is to overcome this technical problem.

In accordance with the invention, this problem is solved by an adapter device for housing a multi-phase low voltage switch inside a switchboard, said adapter device being characterized in that it comprises, for each phase, first and second electric connection means with said switch and third and fourth electric connection means with an electric distribution network, said adapter device being structured so as to define a connection area housing said first and second electric connection means, said adapter device also comprising heat removal means adapted to remove heat from said connection area.

In this manner, heat removal allows the increased resistance caused by the additional connections due to the presence of the adapter device to be dealt with.

Preferably, the heat removal means comprise fan means for forced convection of heat from said connection area. The fans are able to force air toward the connection area, or alternatively to suck air from said connection area, which causes the production of a flow of forced air and heat transmission by convection.

According to a preferred embodiment, the fan means comprise at least one internal fan facing the connection area. It has in fact been noted that, although space available inside an adapter device for a switch for a switchboard is limited, there is sufficient space to fit fans internally. This is particularly advantageous due to the fact that the presence of internal fans is more effective with respect to the presence of external fans. Moreover, and above all, installation of the adapter device according to the present invention is made more simple and practical.

According to a preferred embodiment, the heat removal means comprise duct means that place said connection area in fluid communication with the outside of said switchboard.

Preferably, the duct means comprise, for each phase, at least a first duct and at least a second duct.

According to a preferred embodiment, the duct means comprise at least one duct and a plurality of connector points of the at least one duct to said connection area. In this way, the dimensions inherent to the presence of the ducts can be reduced.

According to a preferred embodiment, the fan means comprise at least one external fan; this latter is positioned outside the connection area; moreover, the duct means comprise at least one duct to place the external fan in fluid communication with the connection area.

Preferably, the connection area is divided into a plurality of compartments mutually separated so as to act as convection channels. It is noted that this can also advantageously be produced by means of separation elements between phases; separation elements are preferably also provided between said first and second electric connection means.

The invention also relates to an adapter-switch assembly comprising an adapter according to the invention and also comprising a switch connectable to the adapter device.

The invention also relates to a switchboard provided with an adapter according to the invention.

Further characteristics and advantages of the present invention will be more apparent from the description of preferred, but not exclusive, embodiments of the present invention, shown by way of example in the accompanying drawings, wherein.

With reference to FIGS. 1-5, a first embodiment of the present invention is illustrated.

Figure 1:
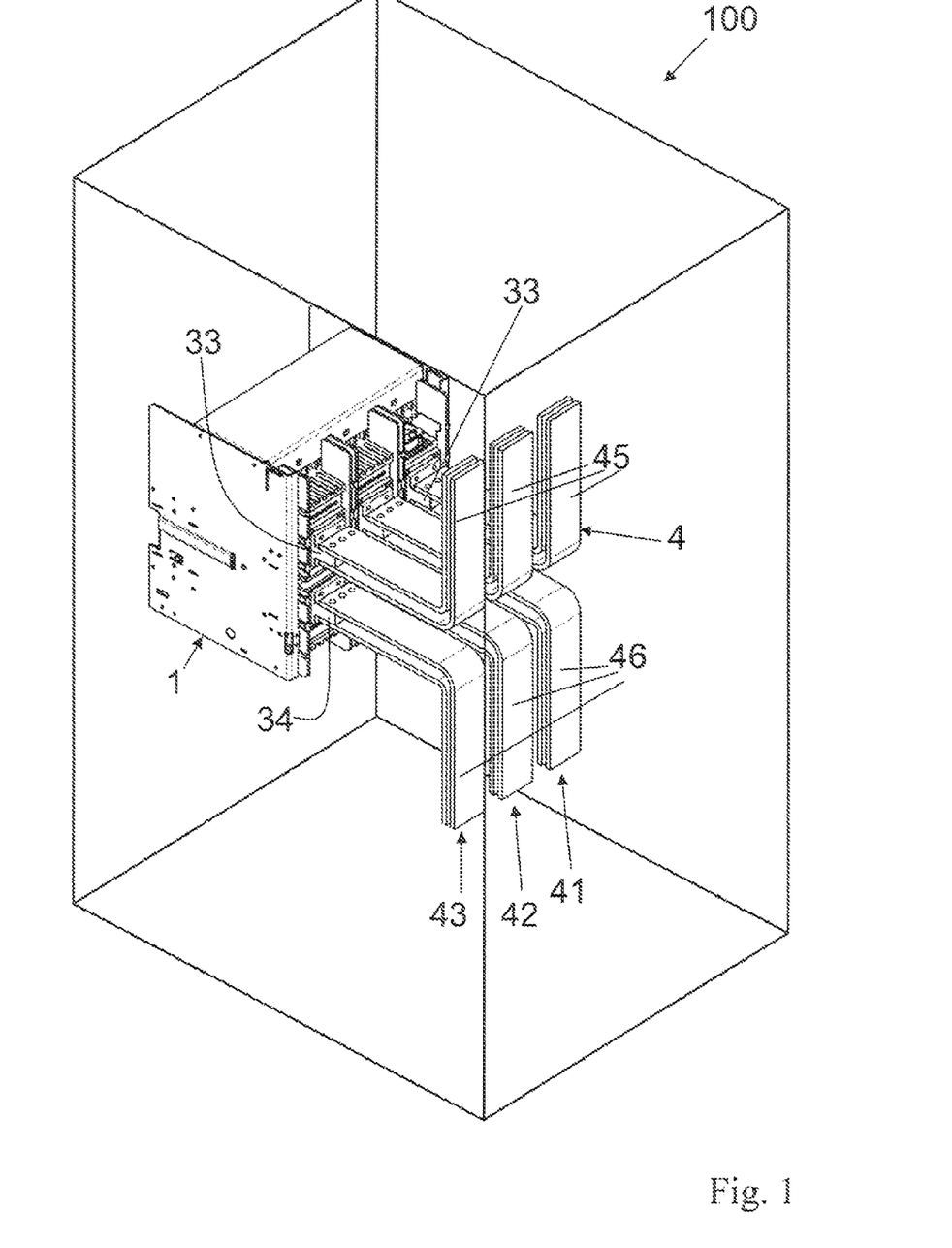
FIG. 1 shows, in a partial view, a first example of adapter device according to the present invention in a switchboard.

In particular, FIG. 1 represents a switchboard 100, known. An electric line for distribution to a plurality of electric loads is indicated as a whole with 4, and is formed, at the connection ends, by bars 45, 46 of conductive material.

The distribution line 4 is of the three-phase low voltage type (maximum 1000 V alternating current, in other embodiments it could be maximum 1500 V direct current). The distribution line 4 is connected to an adapter device 1, which is installed in said switchboard 100 in known manner.

The phases are indicated, in general, with the reference numbers 41, 42, 43, without distinguishing between the phases in said electric distribution line 4 and the phases in said adapter device 1.

Figure 2:
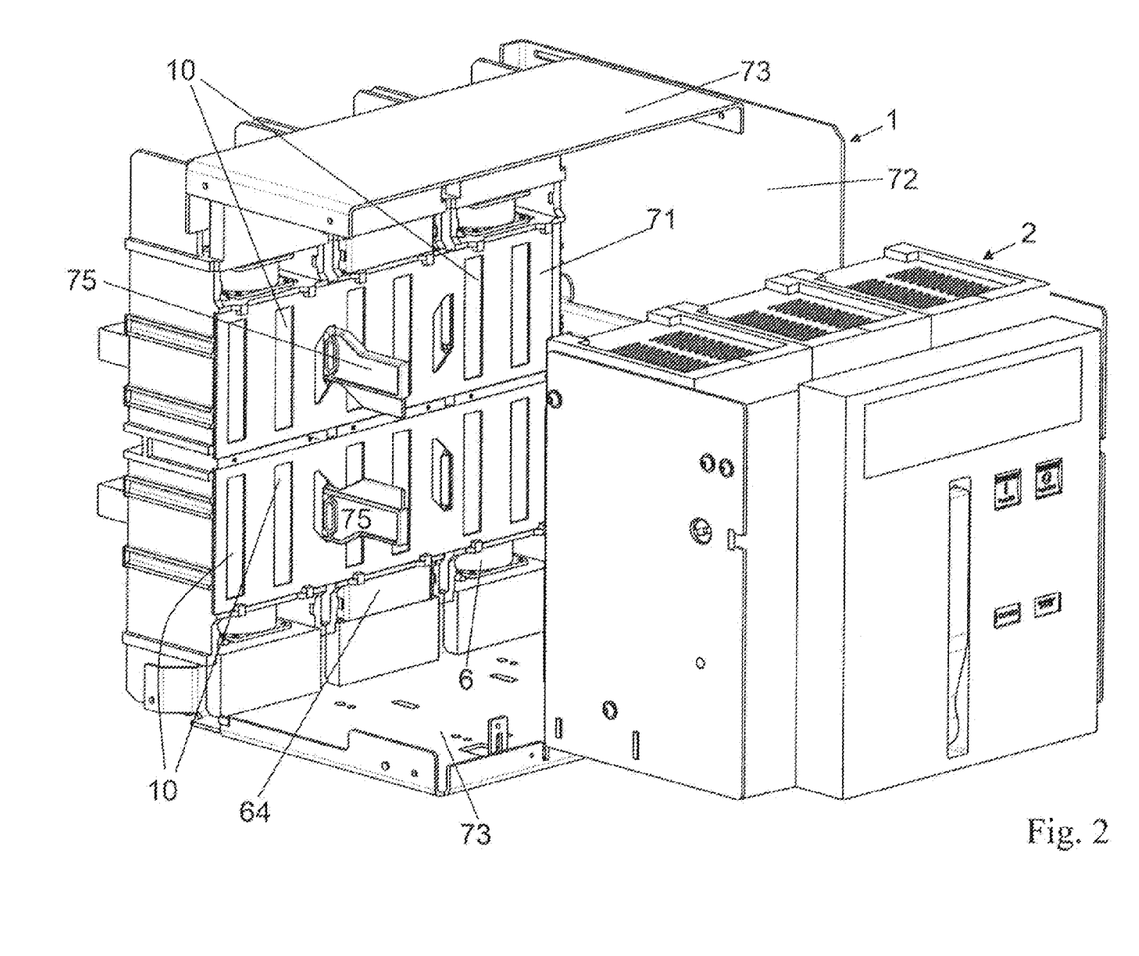
FIG. 2 shows, in a partial view, the adapter device of FIG. 1 and a switch connectable to this adapter device.

As can be noted in FIG. 2, said adapter device 1 is connectable, mechanically and electrically, to a low voltage switch 2 of known type. The adapter device 1 and switch 2 contribute to produce an adaptor-switch assembly 1, 2 according to the present invention, the connection method between adapter device 1 and switch 2 is of withdrawable type (third method): the connection method could also be, in other embodiments, of removable type (second method). The adapter device 1, as visible in FIGS. 2-4, houses and supports the switch 2.

Figure 3:
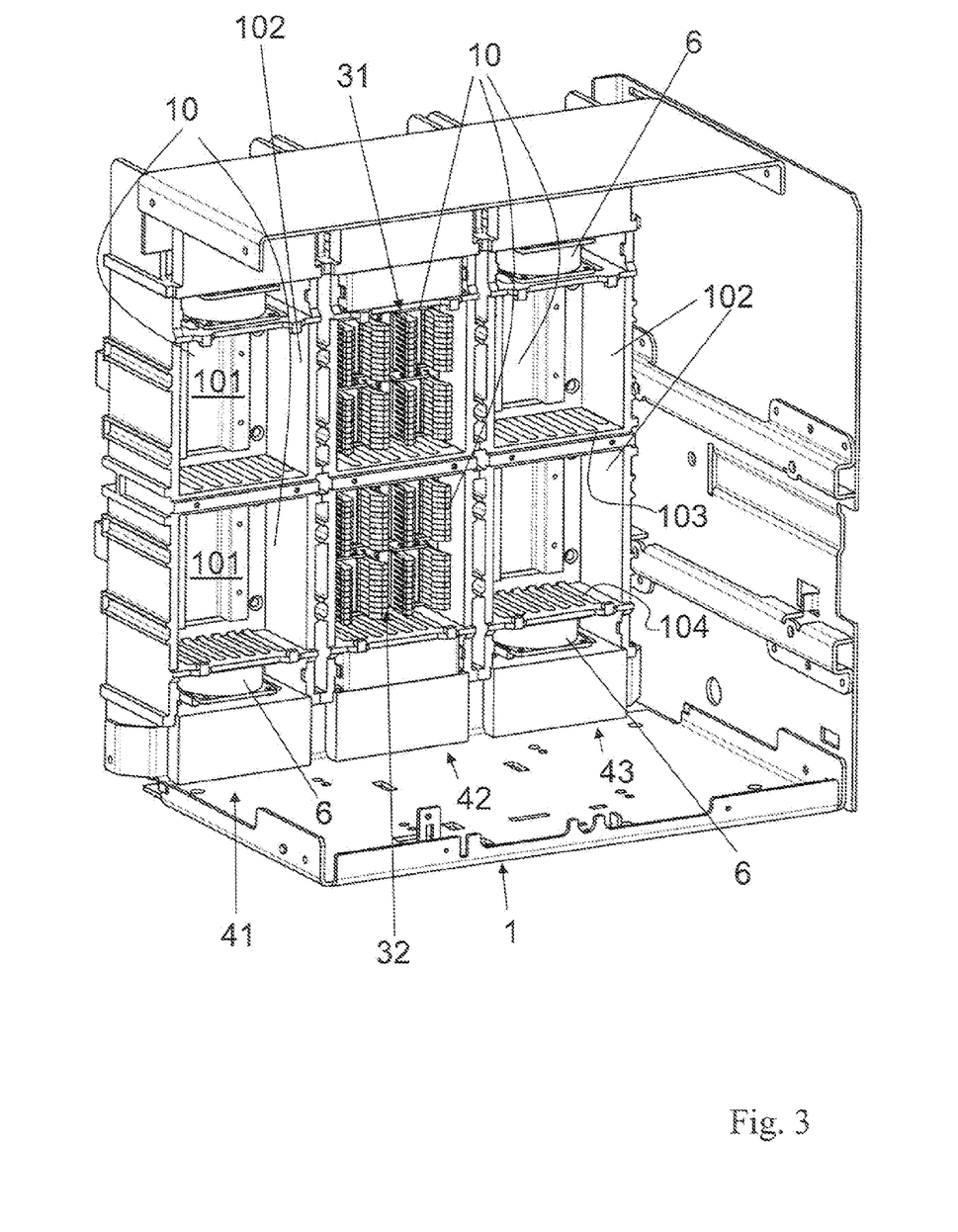
FIG. 3 shows, in a partial view, the adapter device of FIG. 1.

The adapter device 1 has first and second electric connection means 31, 32 for each phase 41, 42, 43 for electric connection with the switch 2 (in FIG. 3 these first and second electric connection means 31, 32 are only drawn in relation to the phase 42, but are in fact also present in the other phases 41, 43). These first and second electric connection means 31, 32 are of known type with clamp moving against an elastic return force that tends to close the moving clamp, which can be opened with pressing contact by pins present in said switch (they could also be of different type in a different embodiment). It is noted that each first electric connection means 31 is positioned vertically above the relative second electric connection means 32.

Figure 4:
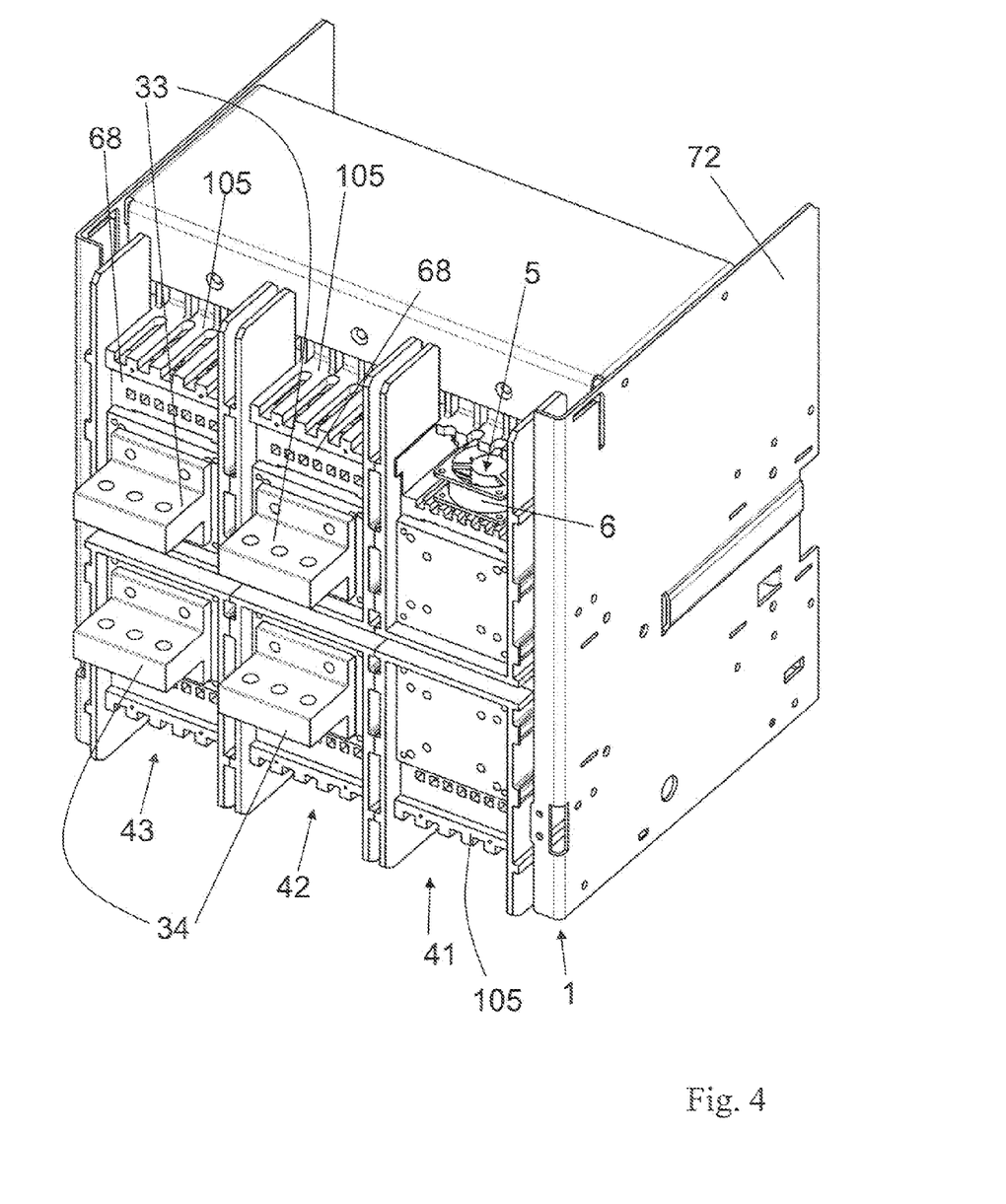
FIG. 4 shows, in a partial view, the adapter device of FIG. 1.
Figure 5:
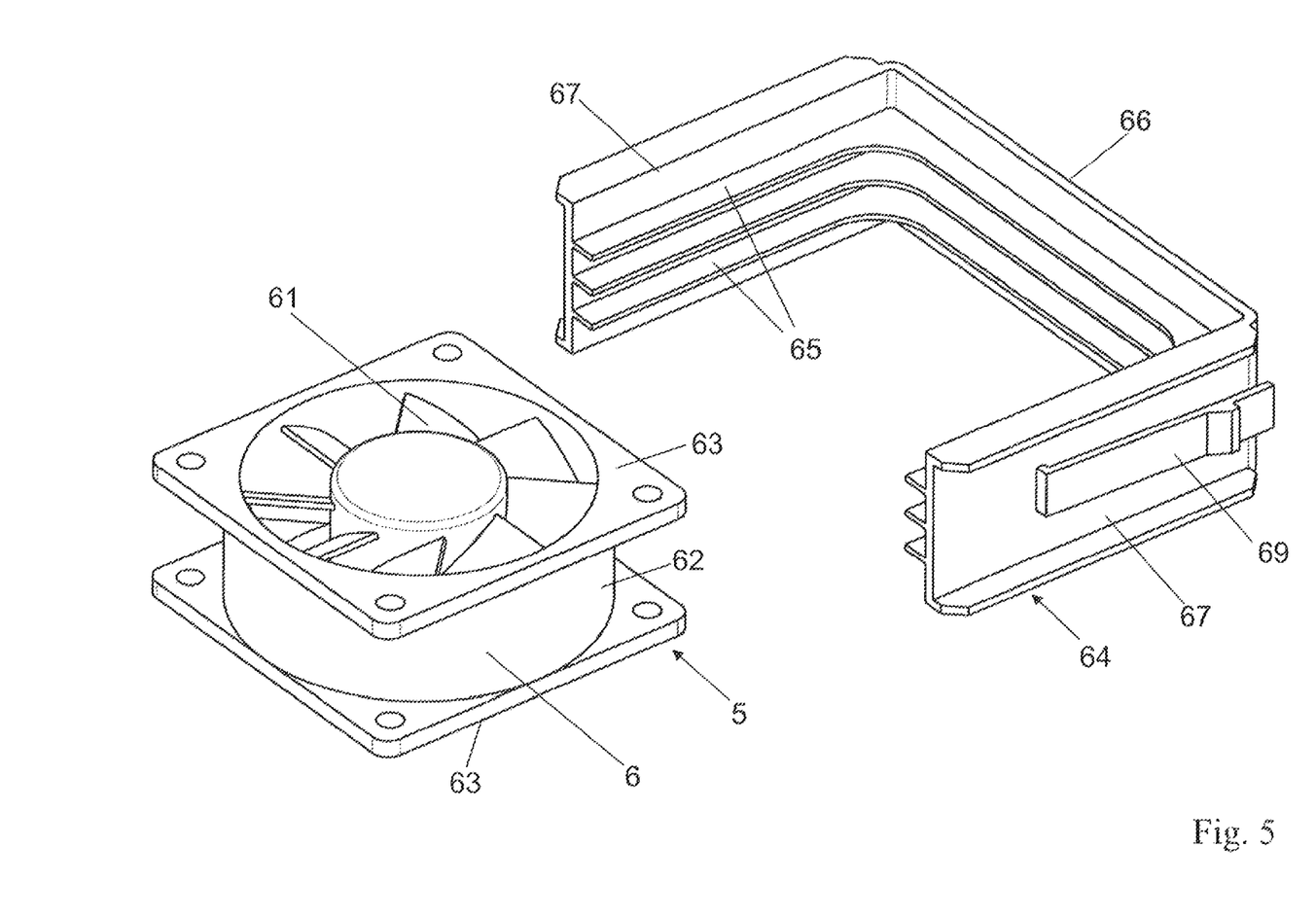
FIG. 5 shows some details of the adapter device of FIG. 1.

The adapter device 1 also houses third and fourth electric connection means 33, 34 for each phase 41, 42, 43 so as to produce an electric connection with the electric distribution network 4 (FIG. 4 does not show the electric connection means 33, 34 relative to the phase 41, which are nonetheless present). In the present embodiment, the bars 45, 46, are respectively in contact with, in the present case screwed to, the respective third and fourth electric connection means 33, 34.

According to the invention, the adapter device 1 defines a connection area 10 which houses the first and second electric connection means 31, 32.

Moreover, the adapter device 1 comprises heat removal means 5 able to remove heat from the connection area 10, so as to cool the first and second electric connection means 31, 32.

The heat removal means 5 comprise fan means 6 to force air movement.

In particular, a pair of fans 6 are provided for each phase 41-43, each fan 6 being positioned in the connection area 10. An upper fan 6 is positioned above each of said first electric connection means 31, while a lower fan 6 is positioned below each of said second electric connection means 32. The fans 6 are able to move air toward the electric connection area 10, so as to force air movement that passes through said electric connection area 10.

Advantageously, the connection area 10 is divided into a plurality of compartments 101. The fact that the compartments 101 are mutually separated between different phases allows said compartments 101 to act as convection channels: in this way, better channeling of the air through the connection area is achieved. Said convection channels are defined by walls 102, which extend essentially vertically. Two compartments of each single phase are separated by means of walls 103. These walls 103, which essentially extend horizontally, are advantageously able to act as reinforcement for the adapter device 1. Advantageously, the walls 103 are of the type with slots, so as to allow the passage of air.

Therefore, advantageously, not only is each single phase 41, 42, 43 separate from the other phases, but the first electric connection means 31 are also separate from the second electric connection means 32 of the same phase as a result of said walls 103.

Each fan 6 has an impeller 61 with essentially vertical rotation axis. Each impeller 61 is housed in a cylindrical sleeve 62 which is part of said fan 6. This cylindrical sleeve 62 is integral with a pair of flanges 63 which are part of said fan 6, said flanges 63 being arranged essentially horizontally. Each of said flanges 63 is supported by a supporting element 64 (FIG. 5 and FIGS. 2 and 3, in which only one supporting element 64 is shown, while the other two supporting elements 64 are not shown). Advantageously, each supporting element 64 comprises grooves 65 which not only guide entry of the flanges 63, but also provide support for the respective fan 6. The grooves 63 are essentially horizontal. Each supporting element 64 is essentially U-shaped. Each supporting element 64 has a central wall 66 which extends mainly horizontally. Advantageously, this central wall 66 also acts as abutment element of said flange 63, so that the position of each fan abuts in a predefined position. The central wall 66 also acts as front cover separating the area in which the switch 2 is to be positioned. Lateral walls 67, which are part of said supporting element, incorporate the grooves 65. Fastening elements 69 of snap-fastening type are present on the lateral walls 67 so as to allow fitting to said walls 102. It is noted that in this way, advantageously, the walls 102 not only act as separation between the compartments 101, but also as support for the fans 6, with considerable saving of means to be used, as in fact the use of specific means to support said fans 6 is unnecessary.

Perforated walls 104 are positioned to separate the space that houses the fans 6 from the compartments 101, so as to allow air to pass into the electric connection area 10.

For each fan 6, a rear separator 68 (in FIG. 4 shown only on two phases, but present on all three) is positioned vertically. This rear separator 68 has holes that allow increased passage of air. In the present embodiment, the holes are arranged in a horizontal row.

Each fan 6 is positioned in a space vertically delimited by walls 105 provided with slots, so as to allow effective passage of air. Therefore, each fan 6 is facilitated in forcing air to pass through the electric connection area 10.

In the present embodiment the fans 6 push air toward the electric connection area 10 which therefore replaces the air inside the electric connection area 10 and produces heat removal of convective type.

Advantageously, the adapter device 1 is not fluid tight, so that it is possible to obtain an outlet for the air without the need to provide a fluid outlet path. However, in other embodiments this fluid outlet path could be provided, so as to vary heat removal conditions.

The adapter device 1 also comprises, in the present embodiment, walls that enclose a housing space for the switch 2, said housing space essentially protruding forward with respect to said connection area 10:

a back wall 71 (not shown in FIG. 3 to allow the connection area 10 to be shown); this back wall 71 is essentially positioned vertically and has slots, corresponding to said first and second electric connection means 31, 32, to allow insertion of the pins of the switch 2 into said first and second electric connection means 31, 32; in the present embodiment, said slots extend essentially vertically; it is noted that the back wall 71 is able to delimit the connection area 10 from the housing space for the switch 2;

a pair of horizontal lateral walls 73, of which one lower horizontal wall and one upper horizontal wall; it is noted in particular that the lower horizontal lateral wall 73 is adjacent to the base of the switch 2;

a pair of vertical lateral walls 72; it is noted that in this way it is simple to fit the switch 2 to the adapter device 1 as insertion is guided.

Control elements 75 emerge from the back wall 71 and operate an automatic mechanism, known (and therefore not shown in the accompanying figures), to open the slots present in the back wall 71, during insertion of the switch 2.

Figure 6:
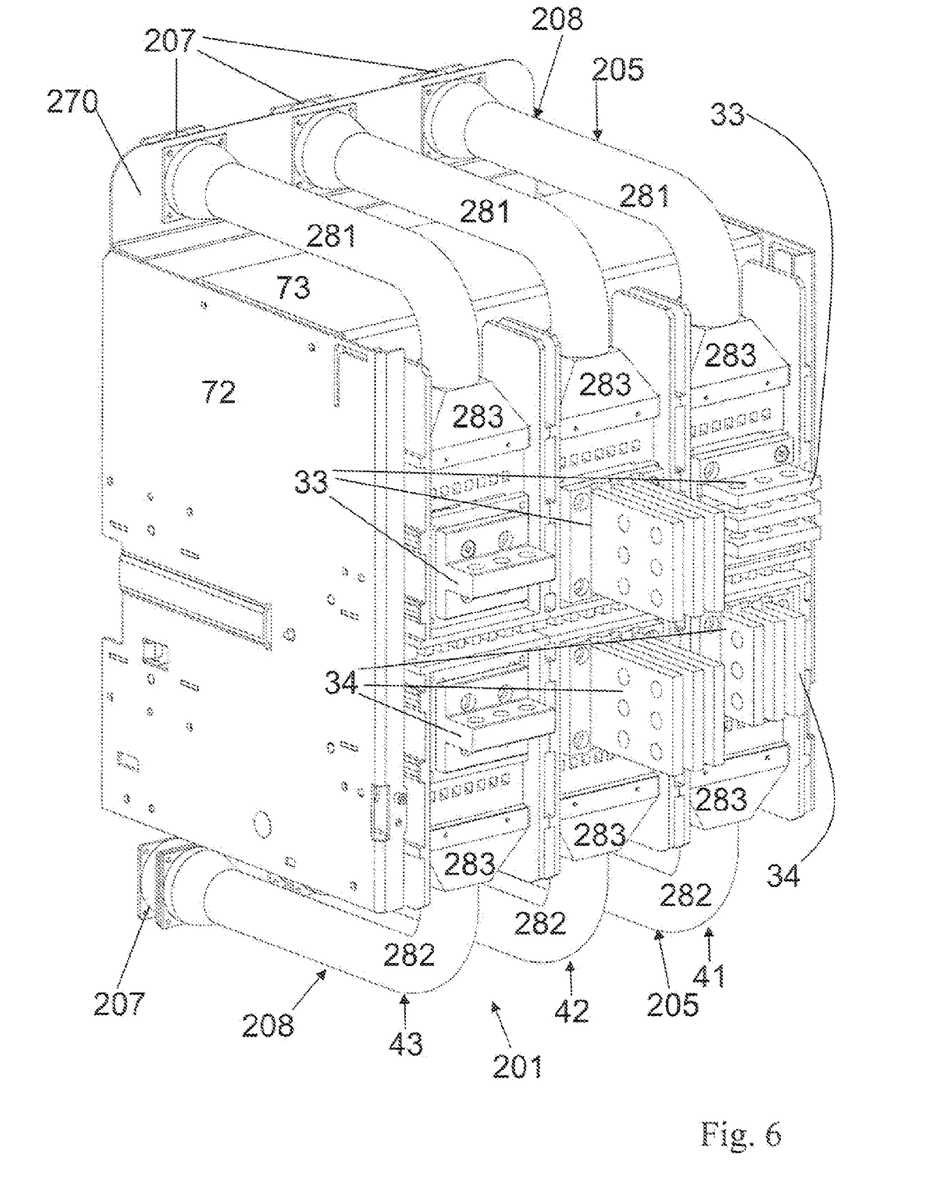
FIG. 6 shows, in a perspective view, a second embodiment of an adapter device according to the present invention.
Figure 7:
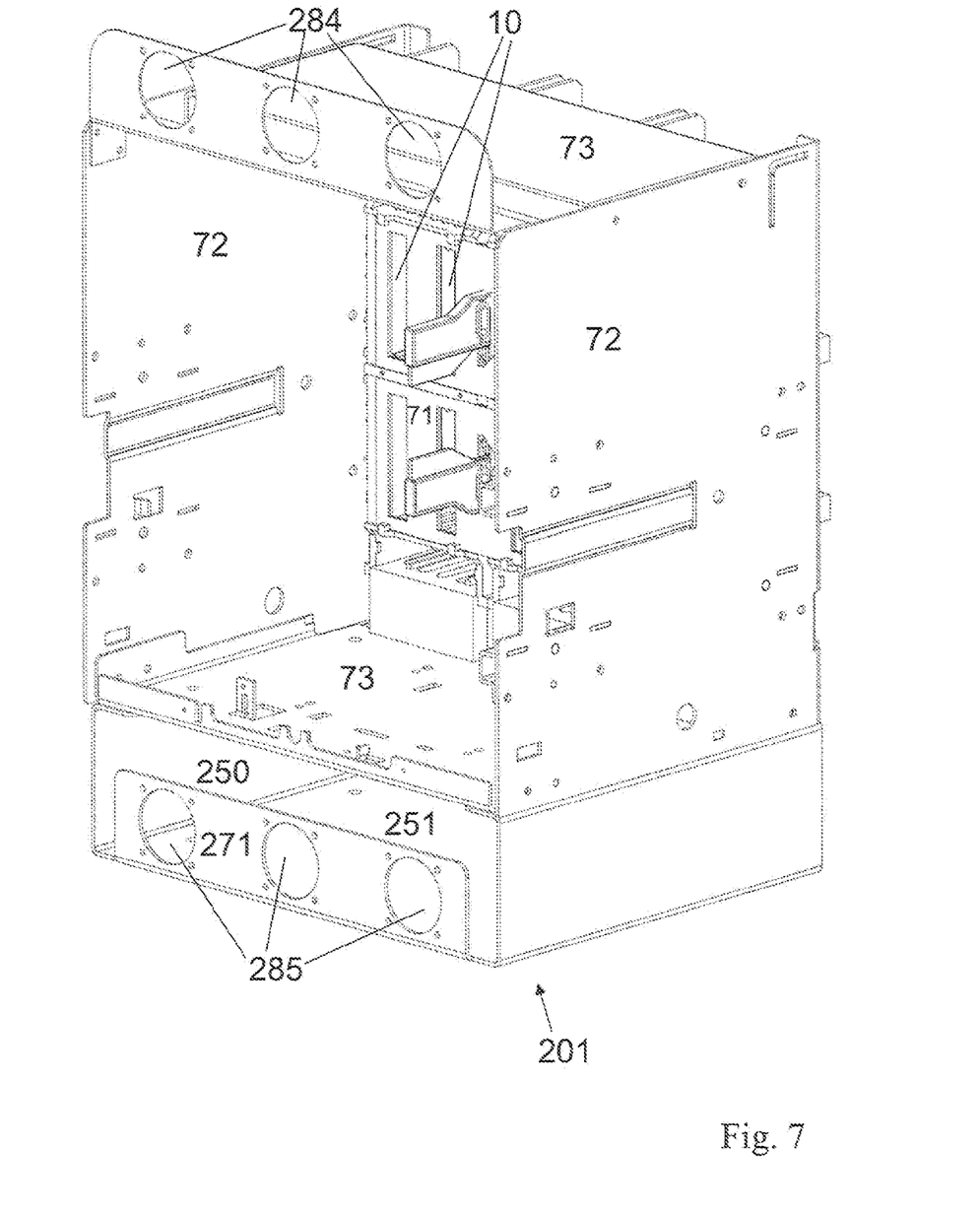
FIG. 7 shows, in a partial view, the adapter device of FIG. 6.
Figure 8:
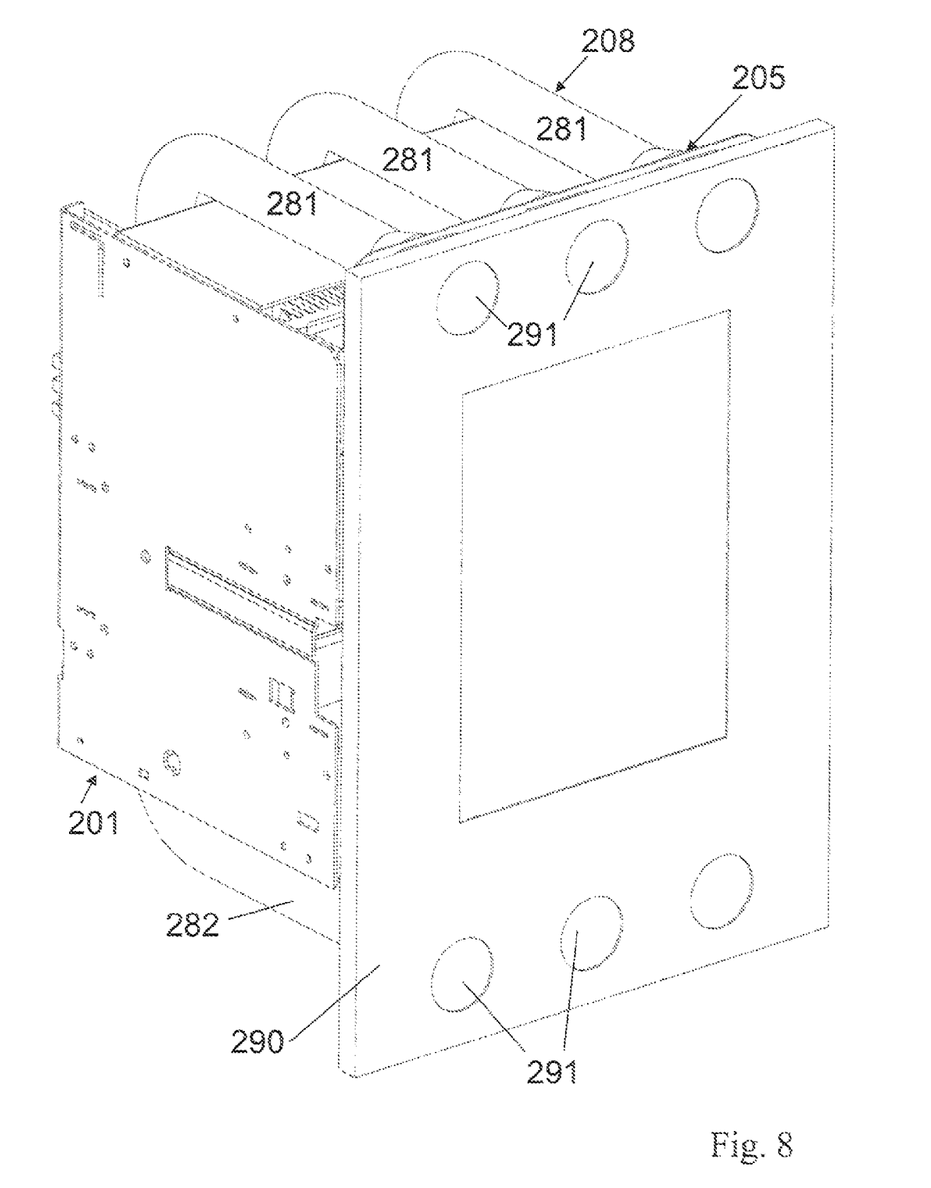
FIG. 8 shows the adapter device of FIG. 6 associated with a door of a switchboard.

A second example of embodiment of adapter device, indicated in this example with 201, is shown in FIGS. 6-8, wherein the same reference numbers relative to the example of the first embodiment are used for analogous components. Also in this case, the adapter device 201 is part of a switchboard 100.

In particular, the adapter device 201 comprises first and second electric connection means, a connection area divided into compartments, internal fans supported by supporting elements and a housing space for a switch 2 just as in the preceding embodiment and using the same reference numbers.

According to the present embodiment, the heat removal means 205 comprise:

internal fans 6 of the same type and inserted in the adapter device according to the first embodiment;

external fans 207, which will be better explained below;

duct means 208 which place the connection area in fluid communication with the outside of the switchboard 100.

In particular, the duct means 208 comprise, for each phase 41, 42, 43, at least a first duct 281 and at least a second duct 282.

The first ducts 281 are positioned essentially above the upper horizontal wall 73. Advantageously, each of said first ducts 281 is positioned downstream of a respective external fan 207 and upstream of a respective internal fan 6. Said external fan 207 is positioned with horizontal rotation axis.

Equally, second ducts 282 are positioned essentially under the lower horizontal wall 73. Advantageously, each of said second ducts 282 is positioned downstream of a respective external fan 207; said external fan 207 is positioned with horizontal rotation axis.

In this way, fresh air is sucked from the outside by means of said external fans 207 and is channeled toward a respective internal fan 6 and subsequently toward the connection area 10 by means of said first and second ducts 281, 282. Connector chimneys are present between the ducts 281, 282 and the respective internal fans 6.

Advantageously, the adapter device 201 comprises an upper surface 270 extending in a flanged manner in upper position, extending essentially vertically. This upper surface 270 supports the three fans 207 positioned above and allows passage of the first ducts 281 by means of respective through holes 284. In this way a simple, but structurally compact and efficient connection is produced.

Advantageously, the connector device 201 comprises a lower compartment 250, which is, in the present embodiment, substantially produced below the lower horizontal wall 73. Said lower compartment 250 comprises a lower surface 271 which extends in a flanged manner upward supported by a lower wall 251 of said lower compartment 250. Said lower surface 271 is such as to generate an empty space between said lower surface 271 and the lower horizontal surface 73. Said lower surface 271 has three through holes 285, one for each phase 41, 42, 43, able to allow the passage of said three lower ducts 282.

It is noted that, advantageously, by means of this system of through holes 284, 285 it is possible to adequately support and retain the ducts 281, 282.

It is noted in FIG. 8 that the adapter device 201 is fitted to a frame 290 which is part of the switchboard 100; advantageously, the frame 290 is associated with a door of the switchboard. It is noted that the only specific feature required by the frame 290 is that of having through holes 291 able to allow the passage of air from the outside toward said ducts 281, 282.

It is important to note that FIG. 6 shows, for reasons of completeness, the different types of third and fourth electric connection means that can be produced; in particular, the third and fourth connection means 33, 34 relative to the phase 42 are different from those relative to the phase 43, while the phase 41 is represented with third electric connection means 33 different from the fourth connection means 34; however, normally, just as in any other embodiment of the present invention, the same third and fourth electric connection means can be used for all phases.

In a third embodiment of the present invention, not shown in the figures as it can be deduced directly from the drawings relative to the previously described second embodiment, no internal fans 6 are provided, and therefore heat convection is performed by the external fans 207 alone.

Figure 9:
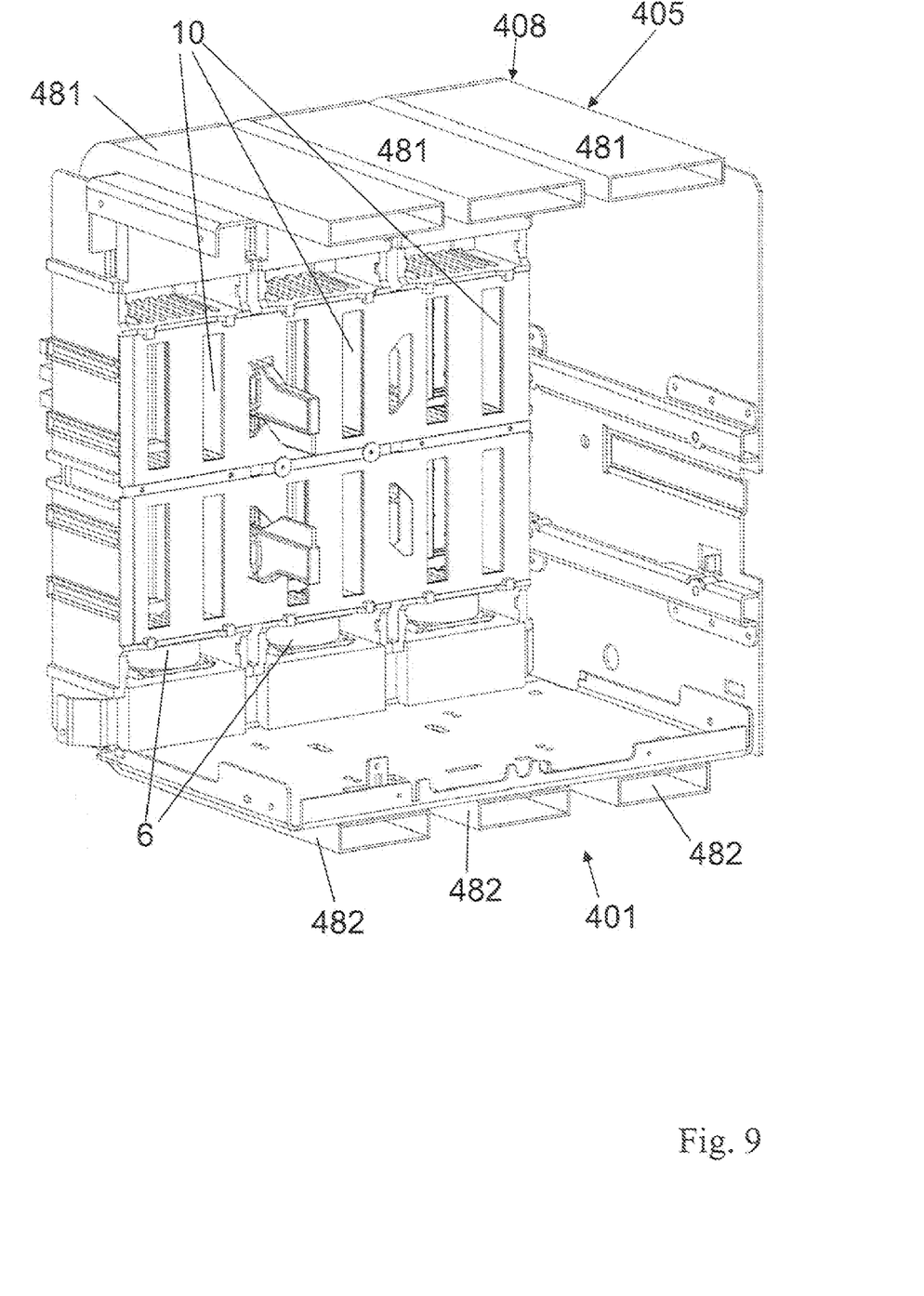
FIGS. 9 and 10 show, in enlarged partial front perspective views, further examples of embodiments of adapter devices according to the present invention.

In a fourth embodiment, shown in FIG. 9 and which is embodied in the adapter device 401, the heat removal means 405 comprise upper ducts 481 and lower ducts 482, in particular with an essentially rectangular section. This embodiment is particularly advantageous in the case in which it is necessary to minimize the vertical dimensions of the adapter device 401.

The fans 6 are of internal type, just as in the first embodiment (in FIG. 9 only the fans in lower position are shown).

Figure 10:
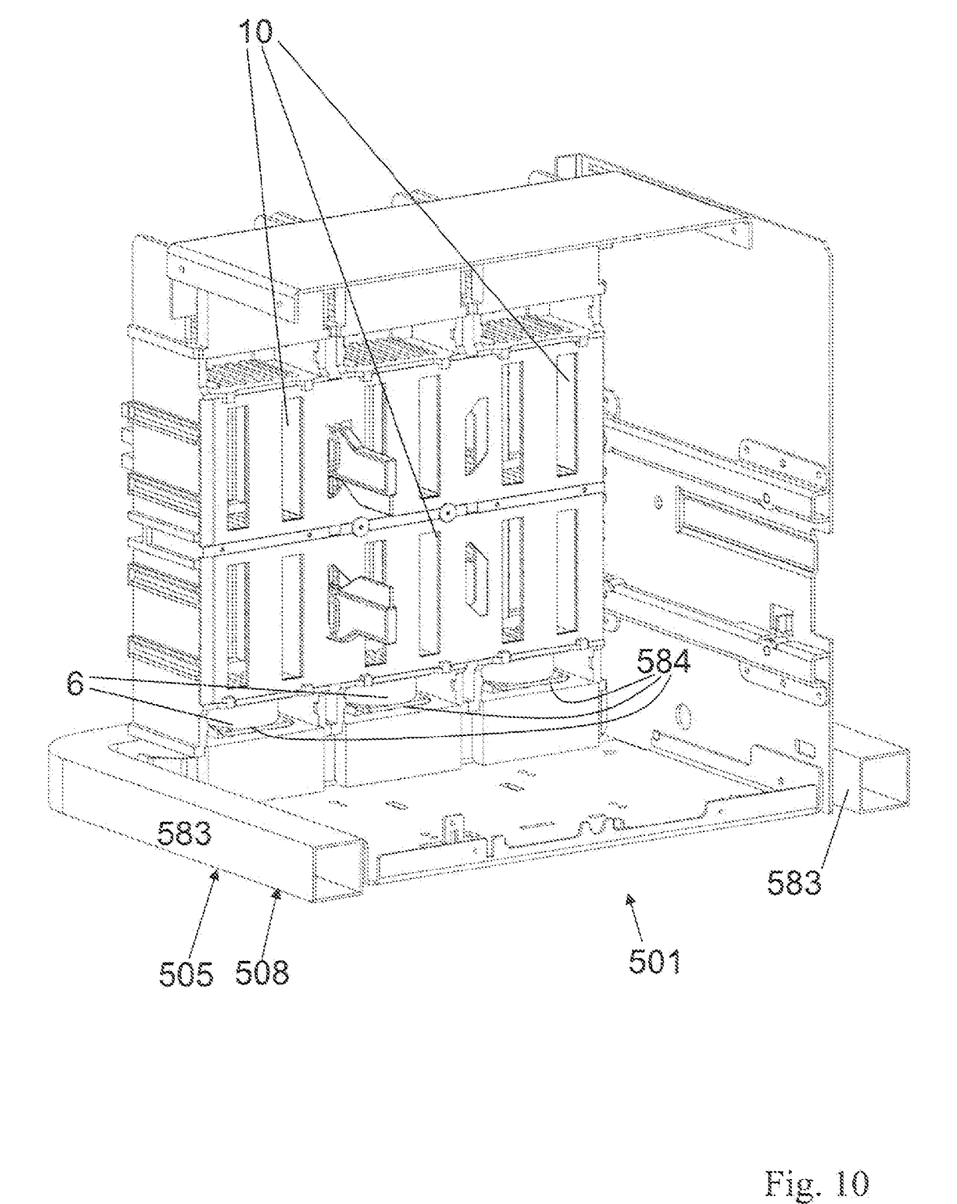

In a fifth embodiment, shown in FIG. 10 and which is embodied in the adapter device 501, the duct means 508 comprise at least one duct 583 which, through connectors present for each phase (the connector areas are indicated with 584), is in fluid communication with the connection area 10. The duct 583 essentially acts as a bus for the air sucked in, from which the fans 6, of internal type, suck in air to send to the connection area 10. This fifth embodiment is particularly advantageous in the case in which it is necessary to minimize, to an even greater extent with respect to the fourth embodiment, the vertical dimensions of the adapter device 501. This fifth embodiment can be fitted according to requirements to the lower terminals, to the upper terminals, or to both.

From an electric viewpoint, with regard to all the embodiments presented, the fans can be supplied by an auxiliary source of electrical energy. In the preferred solution, the fans are self-supplied, i.e. so that they draw energy from the network in which the adapter device according to the invention is installed. In particular, energy can be drawn in voltage form (directly from the bars) or in current form (indirectly, through current transformers). Advantageously, the current transformers can be the same used to supply any protective device (such as a relay) of the switch so as to reduce the components required to produce the present invention. In any case, the supply of each fan can be controllable by means of electronic devices of thermostat type, energy control or the like. Operation of the fans, both internal and external, can in this way be regulated according to the real conditions of need, for example through thermostats, thereby achieving further advantages, such as reducing energy consumption and increasing the useful life of these fans.

In the examples provided, the fans force air toward the connection area. However, in other embodiments of the same invention, these fans could also suck air from the connection area. The variant according to which first compression fans force air into the connection area and second suction fans force air toward the outside of the board is also possible.

The improved positive technical result of the present invention makes it possible to solve problems of overheating of adapter devices with removable/withdrawable installation methods.

It is noted that the present invention also allows the production of an adapter device installable in a rapid and effective manner in a low voltage system, without the need for particular provisions.

Moreover, in this way it is possible to obtain an adapter device installable without distinction in a system with distribution bus bars extending horizontally or extending vertically.

Further, with an adapter device according to the invention it is possible to draw greater electric power than normally possible, so as to provide users with plant design solutions that are extremely compact, efficient and with high energy yield.

In addition, an adapter device according to the invention is more reliable, simpler and less expensive to produce with respect to adapter devices according to prior art.

The invention claimed is:

1. An adapter device for housing a multi-phase low voltage type switch inside a switchboard, said adapter device comprising:
for each phase, first and second electric connectors with said switch and third and fourth electric connectors with an electric distribution network,
said adapter device being structured so as to define a connection area, housing said first and second electric connectors, and
said adapter device also comprising heat removal device adapted to remove heat from said connection area,
wherein said connection area is divided into a plurality of compartments mutually separated between different phases, each of said compartments acting as a convection channel for a corresponding phase.

2. The adapter device according to claim 1, wherein said heat removal device comprise a fan device for forced convection of heat from said connection area.

3. The adapter device according to claim 1, wherein said fan device comprise at least one internal fan facing said connection area.

4. The adapter device according to claim 1, wherein said heat removal device comprises a duct device adapted to place said connection area in fluid communication with the outside of said switchboard.

5. The adapter device according to claim 4, wherein said duct device comprise, for each phase, at least a first duct and at least a second duct.

6. The adapter device according to claim 4, wherein said duct device comprise at least one duct which, through connectors present for each phase, is in fluid communication with said connection area.

7. The adapter device according to claim 2, wherein said heat removal device comprises a duct device adapted to place said connection area in fluid communication with the outside of said switchboard.

8. The adapter device according to claim 7, wherein said fan device comprises at least one external fan positioned outside said connection area and wherein said duct device comprises at least one duct able to place said external fan in fluid communication with said connection area.

9. An adapter-switch assembly comprising an adapter according to claim 1 and a switch connectable to said adapter device.

10. A switchboard comprising an adapter according to claim 1.

11. The adapter device according to claim 2 wherein said fan device comprises at least one internal fan facing said connection area.

12. An adapter device for housing a multi-phase low voltage type switch inside a switchboard, said adapter device comprising:
for each phase, first and second electric connectors with said switch and third and fourth electric connectors with an electric distribution network,
said adapter device being structured so as to define a connection area, said connection area being divided into a plurality of compartments mutually separated between different phases, each of the compartments being configured to house at least one pair of said first and second electric connectors of a corresponding phase, and
each compartment including at least one heat removal device adapted to remove heat from said compartment,
wherein each of said compartments acts as a convection channel for a corresponding phase to channel heat as induced by the at least one heat removal device.

13. The adaptor of claim 12, further comprising:
the at least one heat removal device within each of the compartments being configured to induce an air flow within the corresponding compartment, and
each compartment acts as a convection channel for heat transfer induced by the airflow from the corresponding at least one heating device.

14. The adaptor of claim 12, further comprising:
the at least one heating device comprising first and second fans positioned on opposite sides of the corresponding compartment.

15. The adaptor of claim 14, further comprising:
the at least one heat removal device within each of the compartments being configured to induce an air flow within the corresponding compartment, and
each compartment acts as a convection channel for heat transfer induced by the air flow from the corresponding at least one heating device.

* * * * *